(12) United States Patent
Dirmeyer et al.

(10) Patent No.: US 6,647,793 B2
(45) Date of Patent: Nov. 18, 2003

(54) SENSOR MODULE HAVING A HOUSING WHICH CAN BE FITTED ON A WALL

(75) Inventors: Josef Dirmeyer, Bodenwoehr (DE); Robert Gruber, Regensburg (DE); Harald Schmidt, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/994,204

(22) Filed: Nov. 26, 2001

(65) Prior Publication Data

US 2002/0069700 A1 Jun. 13, 2002

Related U.S. Application Data

(63) Continuation of application No. PCT/DE00/01686, filed on May 25, 2000.

(30) Foreign Application Priority Data

May 25, 1999 (DE) ........................................ 199 23 985

(51) Int. Cl.⁷ ................................................ G01L 7/00
(52) U.S. Cl. ............................ 73/700; 73/431; 73/273
(58) Field of Search ................................ 73/431, 866.5, 73/700

(56) References Cited

U.S. PATENT DOCUMENTS 5,209,495 A * 5/1993 Palmour ..................... 277/500
5,625,156 A   4/1997 Serrels et al. ............. 73/863.51
5,814,765 A   9/1998 Bauer et al. .............. 174/50.54

FOREIGN PATENT DOCUMENTS

| DE | 43 21 068 A1 | 1/1994 |
| DE | 44 42 478 C2 | 6/1995 |
| DE | 44 47 513 A1 | 2/1996 |
| DE | 197 37 821 A 1 | 3/1998 |
| DE | 197 18 392 A 1 | 11/1998 |

OTHER PUBLICATIONS

International Search Report for PCT/DE00/01686, issued by the European Patent Office on Oct. 16, 2000.

* cited by examiner

*Primary Examiner*—Edward Lefkowitz
*Assistant Examiner*—Alandra Ellington
(74) *Attorney, Agent, or Firm*—Laurence A. Greenberg; Werner H. Stemer; Ralph E. Locher

(57) ABSTRACT

A pressure sensor of a pressure-sensor module is connected to a wet space in a vehicle door by a through-passage channel of a sealing cushion and a connecting branch, which is guided with sealing action through a partition. A housing of the sensor module is located in a dry space. An interior of the housing and the dry space are sealed in relation to the interior of the connecting branch, with the result that a water-tightness of the housing, in which a printed circuit board and electronic components are accommodated, does not have to meet high requirements.

9 Claims, 7 Drawing Sheets

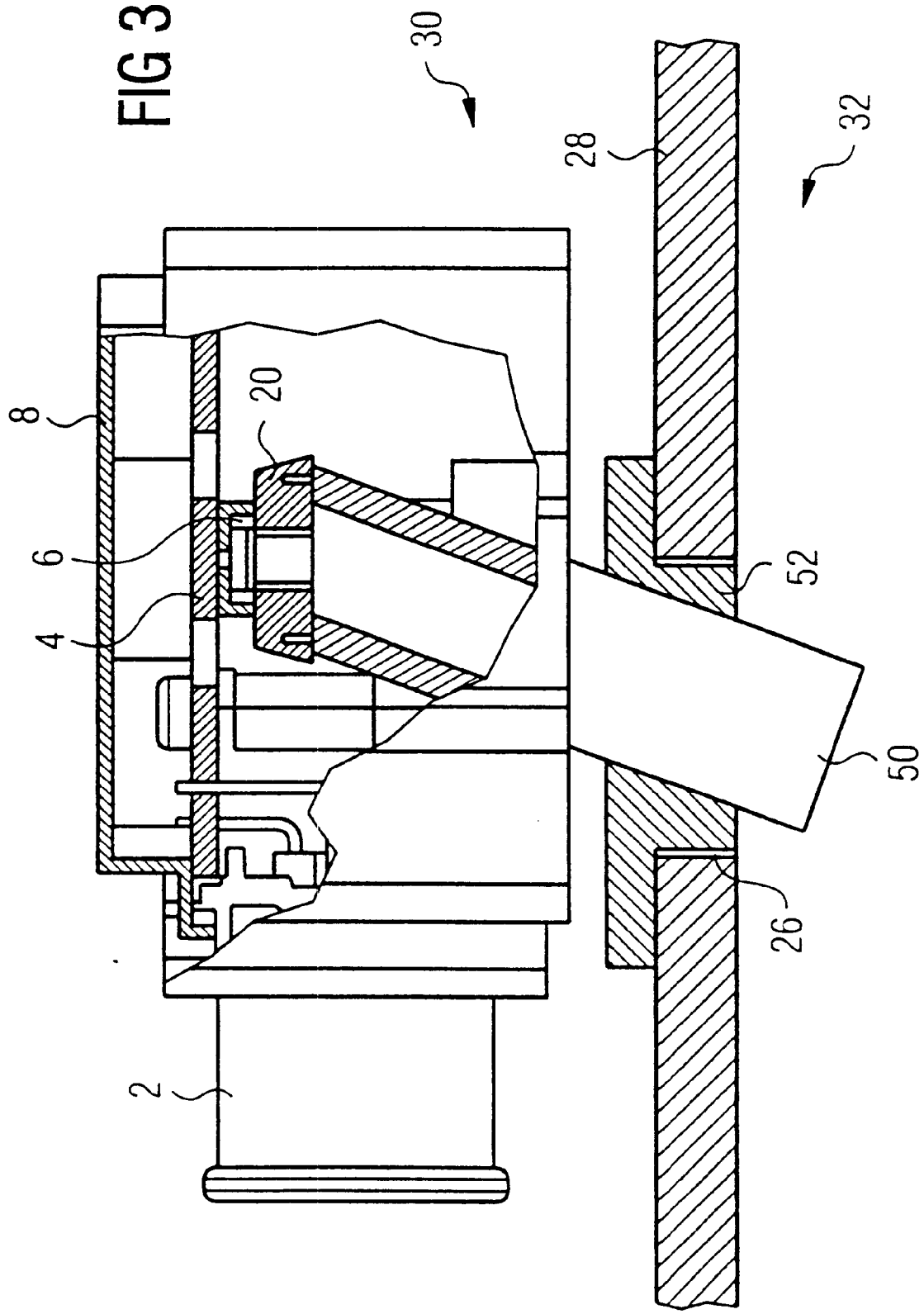

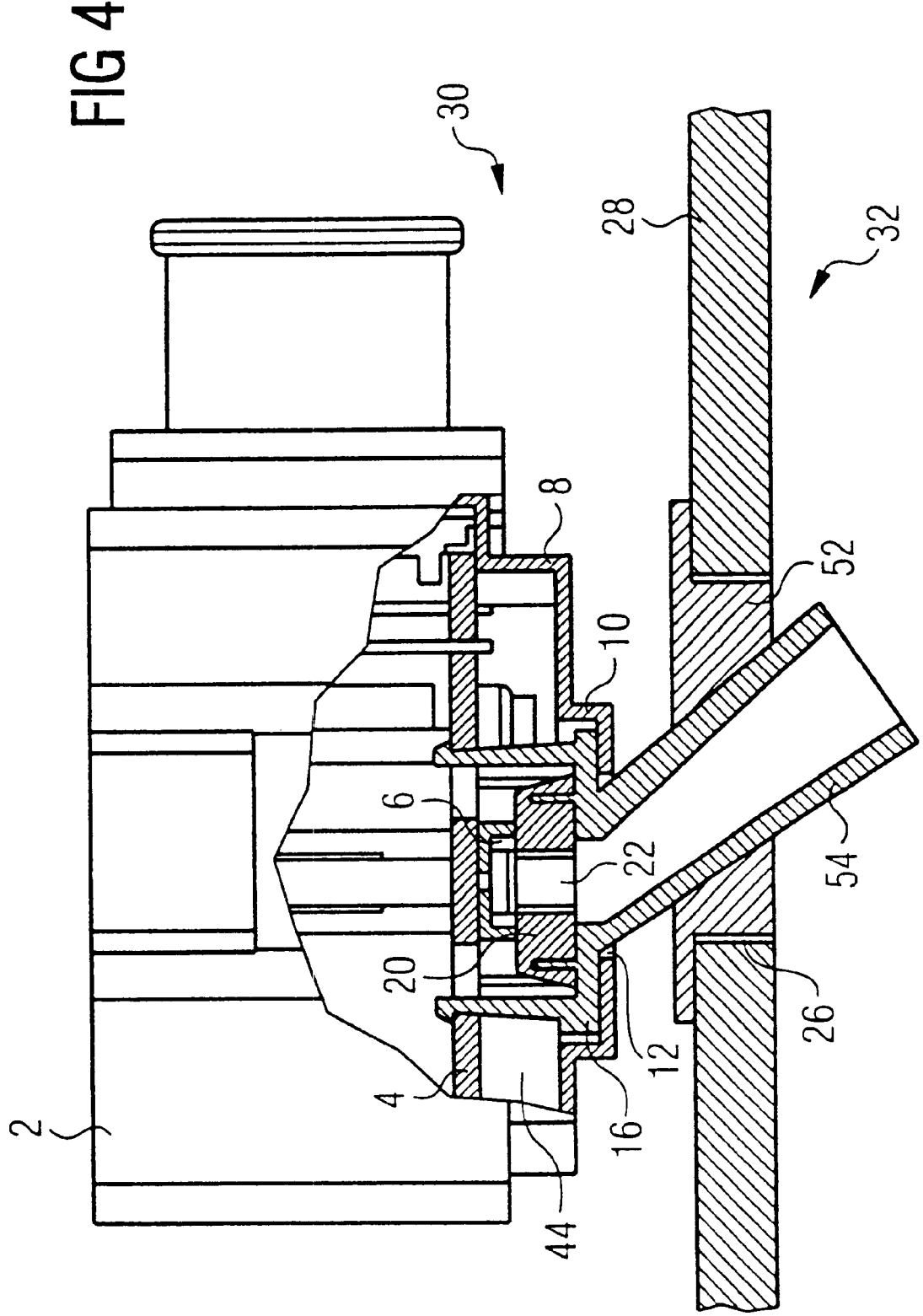

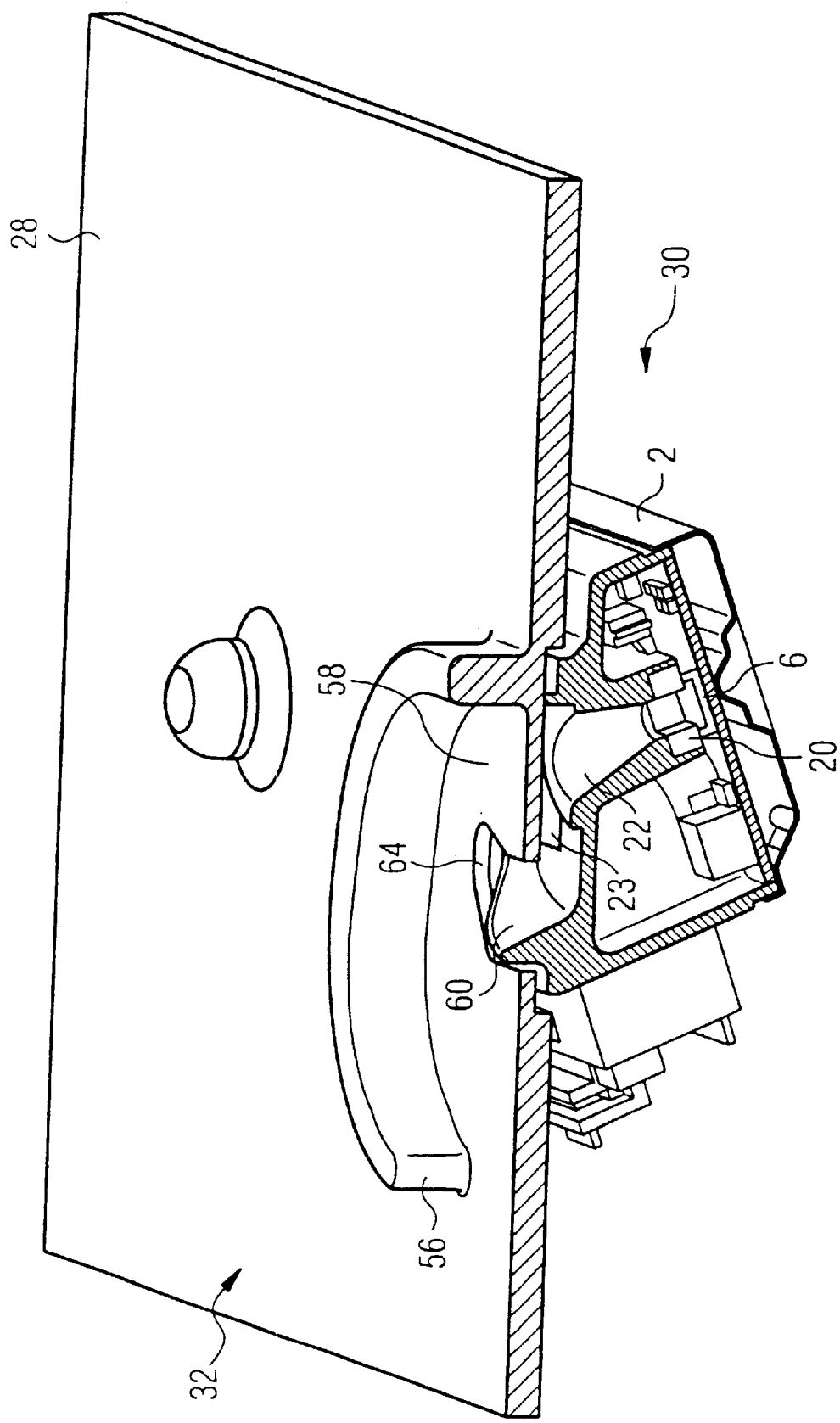

SENSOR MODULE HAVING A HOUSING WHICH CAN BE FITTED ON A WALL

CROSS-REFERENCE TO RELATED APPLICATION

This application is a continuation of International Application No. PCT/DE00/01686, filed May 25, 2000, which designated the United States.

BACKGROUND OF THE INVENTION

Field of the Invention

The invention relates to a sensor module having a housing with a cover that can be fitted on a wall. A pressure sensor is disposed in the housing and a sealing cushion seals the housing interior from the environment. The sealing cushion contains a through-passage channel that connects a pressure-sensitive sensor surface to the environment.

A sensor module of the generic type is known from Published, Non-Prosecuted German Patent Application DE 197 37 821 A1. Provided in a water-tight housing is a sensor element which is embedded in a protective device, for example an elastomer compound, and can be subjected to the action of the atmosphere or of pressurized surroundings via a through-passage channel. The channel leads from a pressure-sensitive surface or diaphragm of the sensor element to a connecting branch, which can latch into a sealing element that is located in a housing or a wall. The pressure-sensitive surface of the sensor may thus be subjected to ambient-pressure fluctuations without the pressure sensor being exposed to ambient humidity.

A sensor module is also known from Published, Non-Prosecuted German Patent Application DE 44 47 513 A1. The housing of the sensor module is a water-tight housing and has a top part and a bottom part as well as a seal disposed between the top part and the bottom part. With the housing assembled, a printed circuit board, on which the pressure sensor is disposed, is accommodated between the top part and the bottom part. The pressure sensor is enclosed by a sealing cushion which, with the housing assembled, is pressed against the printed circuit board by the top part and seals the interior of the housing in relation to a through-passage channel which is formed by a connecting branch, which is formed integrally with the top part and through which the pressure-sensitive surface of the pressure sensor can be subjected to ambient-pressure fluctuation. In order to seal the pressure sensor in relation to moisture from the surroundings, the sealing cushion enclosing the pressure sensor is provided with a diaphragm.

The known sensor module is attached, for example, in vehicle side doors for impact detection. In this case, for reasons of functional reliability, absolute water-tightness is necessary since water and dirt penetrate into the door cavity disposed beneath the windows.

SUMMARY OF THE INVENTION

It is accordingly an object of the invention to provide a sensor module having a housing which can be fitted on a wall which overcomes the above-mentioned disadvantages of the prior art devices of this general type, such that the requirements to be met by the housing in terms of water-tightness and sealing against dirt are reduced, but that the sensor module can nevertheless sense certain parameters in a space exposed to moisture, dirt or other rough ambient conditions.

With the foregoing and other objects in view there is provided, in accordance with the invention, a sensor module to be fitted on a wall having an opening formed therein. The sensor module contains a housing to be disposed in the wall and has a housing interior. A cover is attached to the housing and a pressure sensor is disposed in the housing and has a pressure-sensitive sensor surface. A sealing cushion is provided for sealing the housing interior from the environment. The sealing cushion has a through-passage channel formed therein connecting the pressure-sensitive sensor surface to the environment. A connecting branch connects the through-passage channel to the environment through the opening of the wall. The connecting branch has an end butting with sealing action against the sealing cushion, and the sealing cushion is clamped inbetween the connecting branch and the pressure sensor and presses with sealing action against the pressure sensor.

It is possible for the sensor module according to the invention to be disposed on one side of a wall that separates, for example, a wet space from a dry space, and for the parameter that is to be sensed by the sensor module to be sensed through the wall. It is ensured that the housing interior, which accommodates for example electronic circuits and the like, is protected against being influenced by the harmful ambient conditions on the other side of the wall. The sensor element may be suitable, for example, for sensing temperatures, humidity, pressure fluctuations, etc.

The sensor module for sensing pressure fluctuations according to the invention may advantageously be used, for example, in vehicle side doors that are provided with a partition wall that runs in the longitudinal direction of the vehicle and subdivides the side door into two spaces. Disposed in a dry space is all the electronic equipment that is to be disposed in the vehicle door, for example window motors, locking electronics, etc. The dry space is separated off, by the partition wall, from the wet space on the outer side of the door, into which moisture, dirt, etc. penetrates. In the case of the sensor module according to the invention, the housing may be disposed on the partition wall within the dry space. Nevertheless, it is possible to sense the pressure prevailing in the wet space of the vehicle door, which is absolutely necessary if side impact is to be inferred from pressure fluctuations emanating from the outer door panel. In this way, the sensor module according to the invention may be configured with a housing in which the requirements to be met by the sealing are reduced and which is thus cost-effective to produce.

In accordance with an added feature of the invention, a sealing body is attached to the connecting branch such that, with the sensor module fitted on the wall, the sealing body is disposed between an outside of the connecting branch and the opening in the wall.

In accordance with an additional feature of the invention, the connecting branch is guided through the cover, and the connecting branch has an annular flange that butts against an inside of the cover.

In accordance with another feature of the invention, a base plate is disposed in the housing and bears the pressure sensor. The annular flange has a side directed away from the inside of the cover. The annular flange has resilient legs on the side for fitting the connecting branch on the base plate.

In accordance with a further feature of the invention, the connecting branch is guided through the sealing body.

In accordance with another added feature of the invention, the connecting branch is inserted into the sealing body, and the sealing body is configured with an extension extending from the connecting branch.

In accordance with another further feature of the invention, the cover and the connecting branch are formed as a one piece unit. The cover has a run-off nose from which water can drip off, and in that, with the sensor module fitted on the wall, part of the cover along with part of the wall forms a further channel connecting the through-passage channel to the opening in the wall.

In accordance with a further additional feature of the invention, a printed circuit board is clamped inbetween parts of the housing and the pressure sensor, and the pressure sensor is disposed on the printed circuit board.

In accordance with a concomitant feature of the invention, a diaphragm is disposed between the through-passage channel of the sealing cushion and a surface of the pressure sensor.

Other features which are considered as characteristic for the invention are set forth in the appended claims.

Although the invention is illustrated and described herein as embodied in a sensor module having a housing which can be fitted on a wall, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a side-elevational, partially cut-away sectional view, of a third embodiment of the sensor module;

FIG. 4 is a side-elevational, partially cut-away sectional view of a fourth embodiment of the sensor module;

FIG. 5b is a bottom, perspective view of the sensor module shown in FIG. 5a;

FIG. 7 is a perspective side view, partially in section, of the sensor module shown in FIG. 6.

DESCRIPTION OF THE PREFERRED EMBODIMENTS

Figure 1:
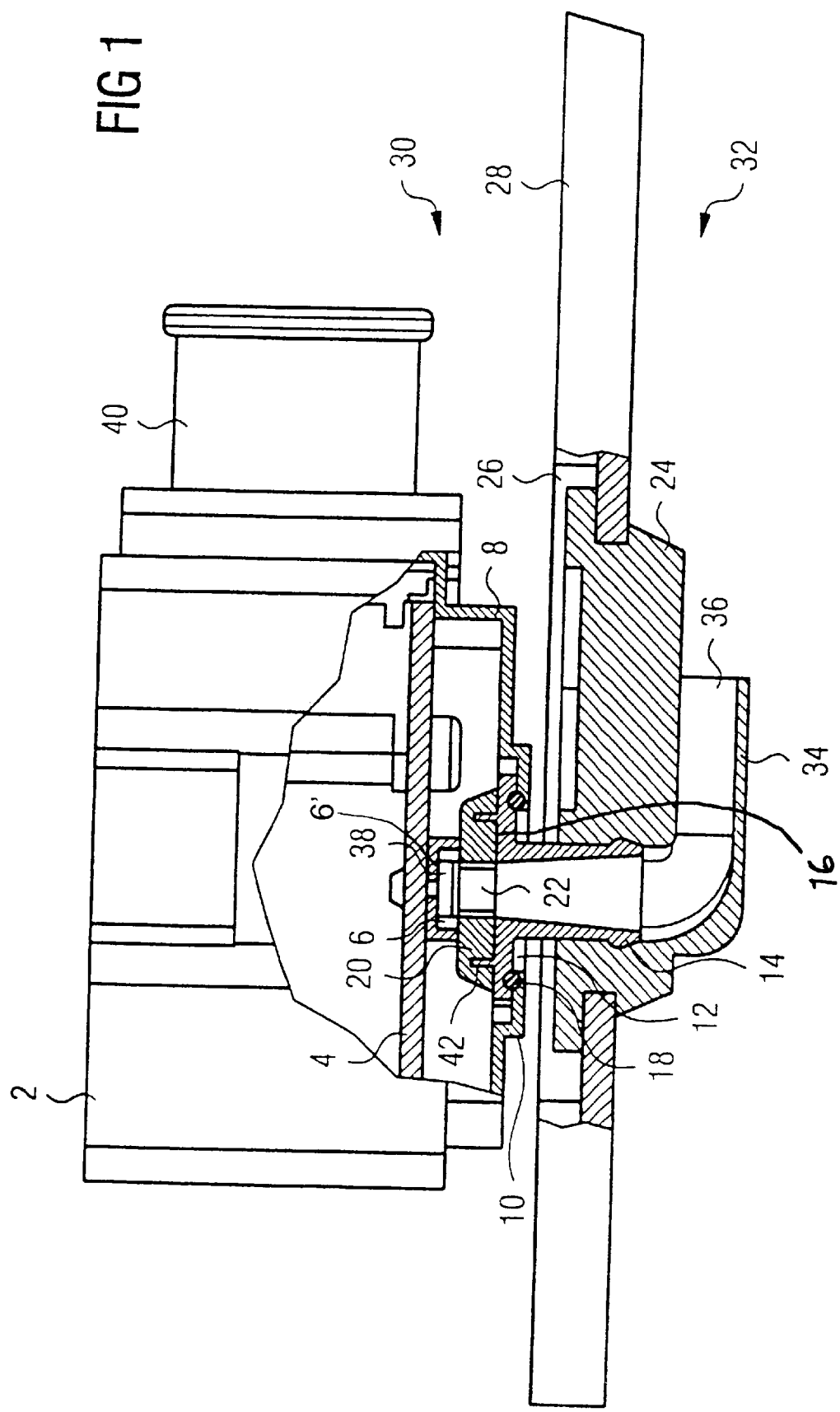
FIG. 1 is a diagrammatic, side-elevational, partially cut-away sectional view, of a first embodiment of a sensor module according to the invention.

Referring now to the figures of the drawing in detail and first, particularly, to FIG. 1 thereof, there is shown a printed circuit board 4, on which a pressure sensor 6 is disposed, and is accommodated in a housing 2 of a sensor module. The pressure sensor 6 may contain, for example, a piezo element or a diaphragm that is capable of vibrating, and of which the movement is sensed capacitively. The housing 2 has a cover 8, which is configured with a step 10 and has an opening 12. Projecting through the opening 12 is a connecting branch 14 that is configured, at one end, with an annular flange 16 that engages behind the opening 12. A sealing ring 18 is disposed between the annular flange 16 and an inner wall of the cover 8. The surface of the annular flange 16 that is directed away from the cover 8 butts against a sealing cushion 20 and presses the latter against a front surface of the pressure sensor 6. In the example illustrated, the sealing cushion 20 is of cylindrical shape overall and has a through-passage channel 22 which terminates opposite a pressure-sensitive surface 6' of the pressure sensor 6 and merges into an interior of the connecting branch 14.

That end of the connecting branch 14 which is directed away from the annular flange 16 is inserted with sealing action into a through-passage opening of a sealing body 24, which is inserted into a through-passage opening 26, which is formed in a wall 28, with sealing being provided in the process.

The wall 28 may be, for example, the partition wall that is formed in a vehicle door and divides the interior of the vehicle door into a dry space 30 and a wet space 32.

The sealing body 24 is configured with an extension 34 that has a channel 36, which extends the interior of the connecting branch 14 and connects the through-passage channel 22 to the surroundings and/or the wet space 32.

If necessary, a diaphragm 38 is provided between the pressure-sensitive surface of the pressure sensor 6 and the through-passage channel 22 of the sealing cushion 20, the diaphragm 38 protecting the pressure sensor 6 against moisture, but maintaining the pressure coupling between the pressure-sensitive surface of the pressure sensor 6 and the wet space 32.

The module is assembled as now described. The printed circuit board 4 with non-illustrated electronic components disposed thereon is fitted in a manner known per se in the housing 2, which may be of multi-part construction. The printed circuit board 4 is connected electrically via a plug connection 40 (FIG. 2).

According to FIG. 1, the printed circuit board 4 can be inserted into the housing 2 from beneath, the cover 8 still being absent. Guided through the opening 12 of the cover 8 is the annular flange 16, to which the sealing cushion 20 is attached, fastened for example via small extensions 42. The cover 8 is then fastened on the housing 2, for example clipped to the housing 2, the cover 8 bringing the annular flange 16, the sealing cushion 20 and the pressure sensor 6, fitted on the printed circuit board 4, into abutment against one another and, at the same time, pressing the printed circuit board 4 against a mating surface formed on the housing 2. The connecting branch 14 is then pushed into the sealing body 24 fitted on the partition wall 28, this providing a connection between the interior of the wet space 32 and the diaphragm 38, which may be formed, for example, integrally with the sealing cushion 20, the connection being reliably sealed both in relation to the interior of the housing 2 and in relation to the dry space 30.

Of course, the housing 2 may be fastened rigidly on the wall 28 via fastening devices, for example screws, which are not illustrated in FIG. 1.

Figure 2:
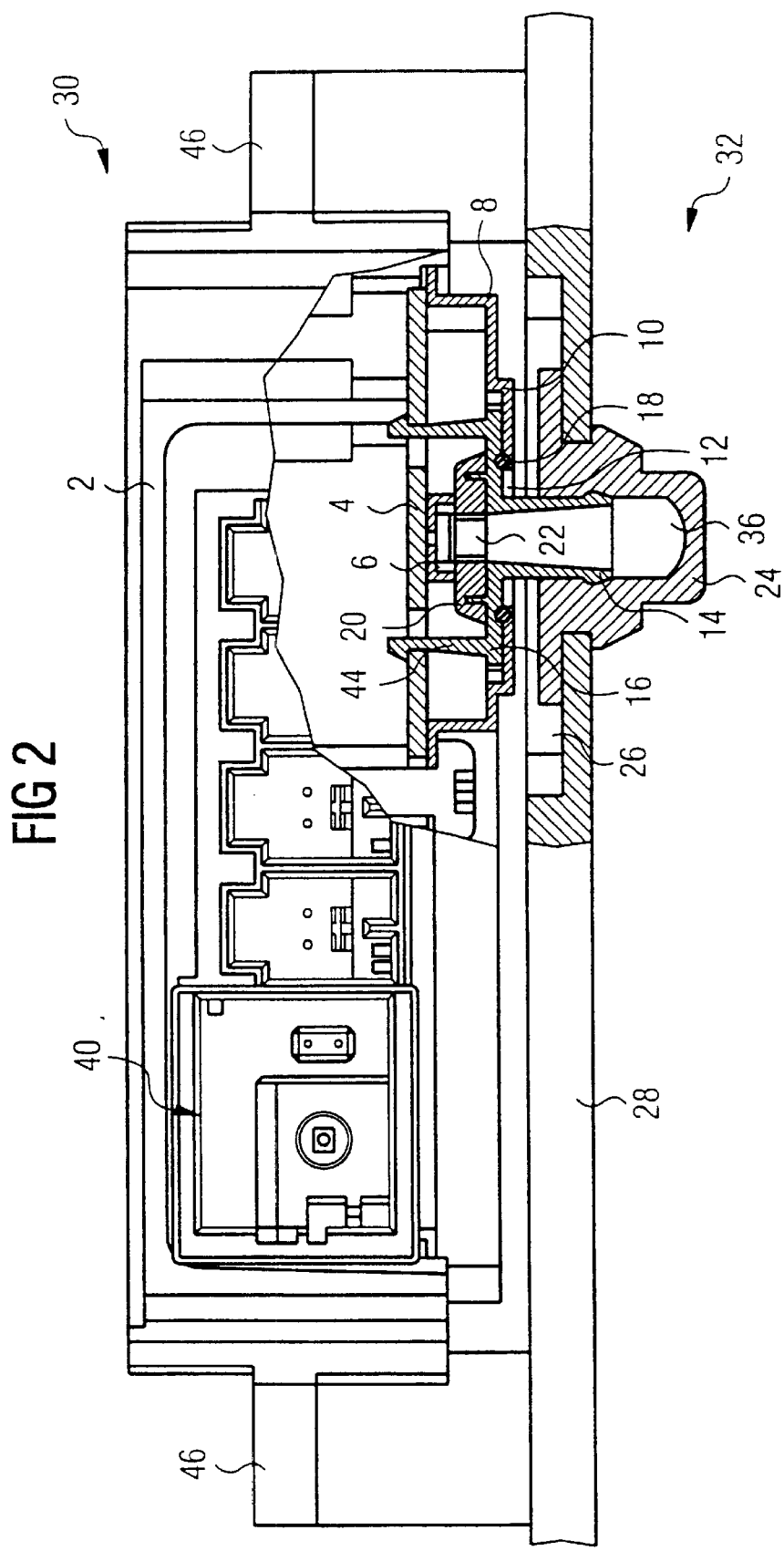
FIG. 2 is a rear-elevational, partially cut-away sectional view, of a further embodiment of the sensor module.

FIG. 2 shows an embodiment of the module that has been modified in relation to FIG. 1. The same designations are used for parts with the same functions. Only the differences are described.

The sealing body 24 may be configured in the same way as the sealing body 24 of FIG. 1; the view of FIG. 2 has merely been rotated through 90° about a vertical axis, with the result that the view given is in the direction of the channel 36.

In contrast to the embodiment of FIG. 1, in the case of the embodiment according to FIG. 2, the annular flange 16 of the connecting branch 14 is provided with resilient legs 44, with the aid of which the connecting branch 14 can be clipped into the printed circuit board 4. In this way, it is possible for the connecting branch 14 to be preassembled with the sealing cushion 20 on the printed circuit board 4 without the cover 8. The resilient legs 44 are advantageously dimensioned such that the sealing cushion 20 is already compressed at the time of the preassembly operation. FIG. 2 shows housing extensions 46, with the aid of which the housing 2 can be fastened on the wall 28.

The functioning and the assembly of the module according to FIG. 2 is otherwise the same as in FIG. 1. Of course, the illustrations of FIGS. 1 and 2 may be two different views of a single embodiment.

FIG. 3 shows a further embodiment of the sensor module. In this embodiment, the cover 8 of the housing 2 is attached to that side of the housing 2 that is directed away from the wall 28. A connecting branch 50 is formed integrally with the housing 2 and projects through a sealing body 52 inserted into the through-passage opening 26 of the wall 28. The sealing cushion 20 is attached to the inner end of the connecting branch 50 and presses against the pressure sensor 6, which, as in the other embodiments, is fitted on the printed circuit board 4.

In the embodiment according to FIG. 3, assembly takes place as now described. With the cover 8, which may be configured as a straightforward sheet-metal cover, removed, the sealing cushion 20 is attached to the end of the connecting branch 50. The sealing cushion 20 may, once again, be provided with a diaphragm. The printed circuit board 4, fitted with the pressure sensor 6 and further electronic components, is then inserted into the housing 2 from above. By virtue of the cover 8 being fastened on the housing 2, it being possible for this to take place by straightforward clipping, screwing or the like, the printed circuit board 4 is pressed with the pressure sensor 6 against the sealing cushion 20, with the result that the interior of the connecting branch 50 is sealed reliably in relation to the housing interior. The functioning of the module according to FIG. 3 is otherwise the same as the embodiment that has already been described.

FIG. 4 shows a further embodiment of the module that, in a certain way, is similar to FIG. 2.

In the embodiment according to FIG. 4, a connecting branch 54 is guided through the sealing body 52. Similarly to the embodiment according to FIG. 4, the annular flange 16 of the connecting branch 54 is configured with the resilient legs 44, with the aid of which the connecting branch 54 and the sealing cushion 20 may be preassembled on the printed circuit board 4. Since the interior of the connecting branch 54 extends without interruption from the wet space 32 to the through-passage channel 22 of the sealing cushion 20, the sealing ring 18 between the annular flange 16 and the cover 8 is superfluous in the embodiment according to FIG. 4.

For assembly of the module according to FIG. 4, with the connecting branch 54 preassembled, the cover 8 is pushed over the connecting branch and then fitted on the housing 2. The connecting branch 54 is then pushed through the sealing body 52 and the housing 2 is fastened on the wall 28.

FIGS. 5a to 7 show a modified, fifth embodiment of the sensor module according to the invention.

Figure 5A:
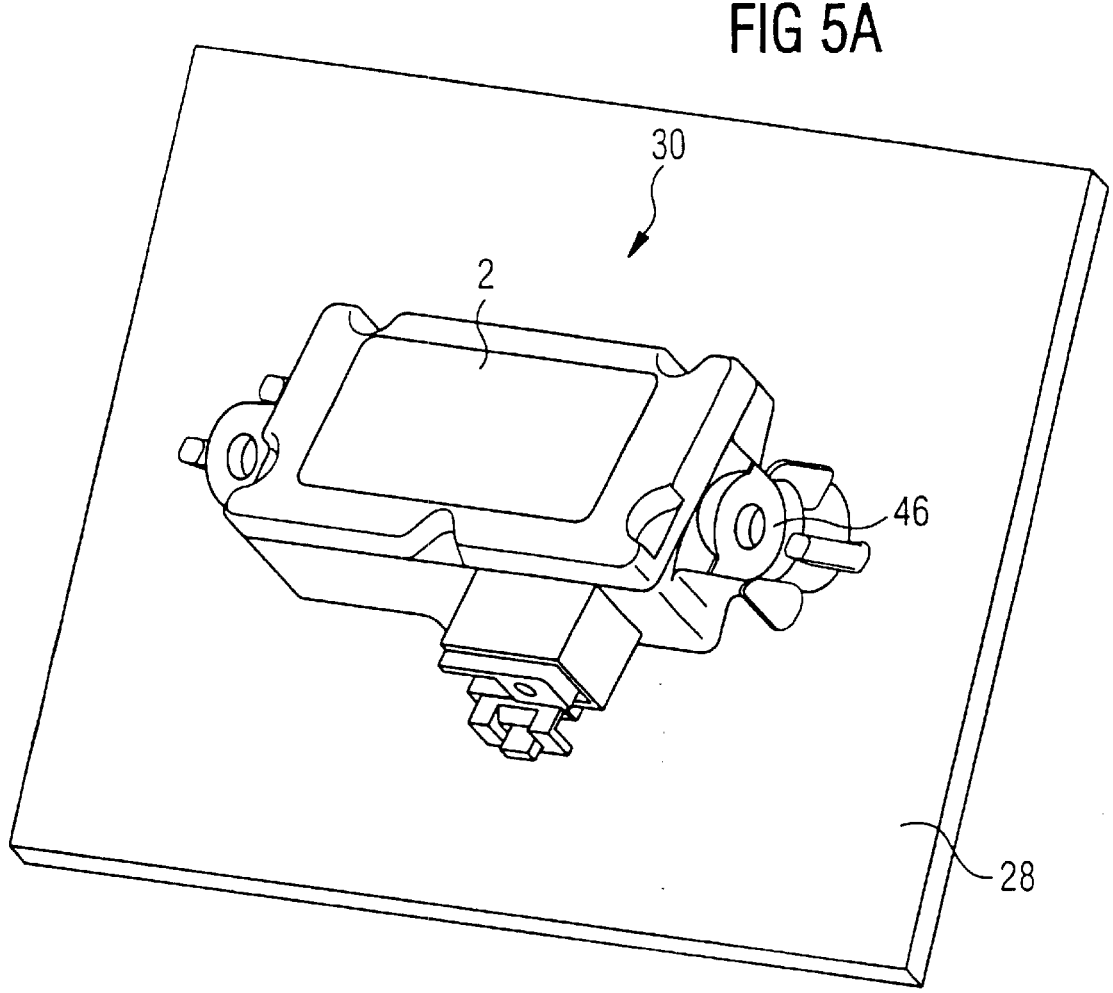
FIG. 5a is a top, perspective view of a fifth embodiment of the sensor module.
Figure 5B:
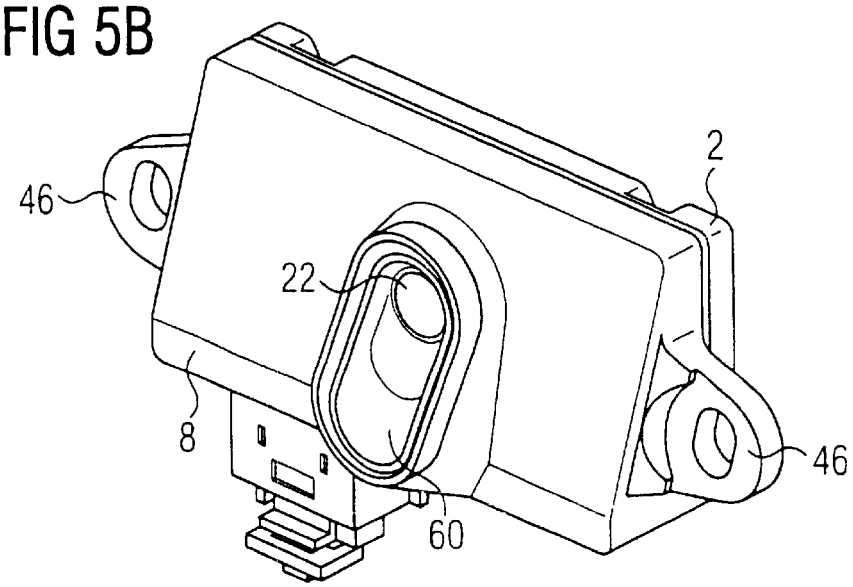

FIGS. 5a and 5b thus each show perspective views of the fifth embodiment of the sensor module, from above (FIG. 5a), i.e. as seen from the dry space 30, and from beneath (FIG. 5b), i.e. as seen from the wet space 32. FIG. 5a shows the sensor module fitted on the wall 28 via the housing extensions 46, the housing 2 being oriented toward the viewer. FIG. 5b illustrates the same sensor module from its underside, it likewise being possible to see the housing extensions 46 and the housing 2, which is oriented away from the viewer.

Projecting through the cover 8 in this case are the through-passage channel 22 and a run-off nose 60 that, in the modified, fifth embodiment, replaces the connecting branch 50, 54 from the third and fourth embodiments, respectively. The particular configuration and functioning of the run-off nose 60 will be explained in more detail in the following descriptions of the figures.

Figure 6:
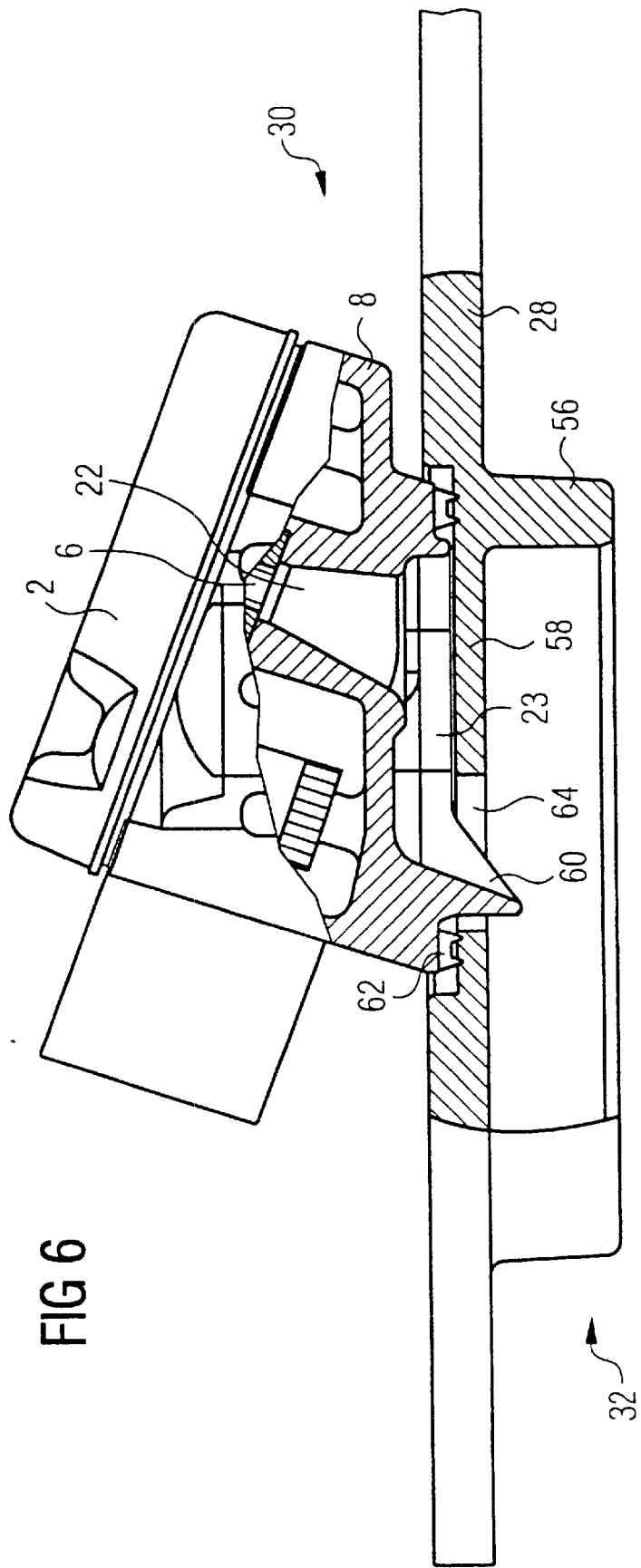
FIG. 6 is a side-elevational, partially cut-away sectional view, of the fifth embodiment of the sensor module.

FIG. 6 shows a side view, partially in section, of the fifth embodiment of the sensor module according to the invention from FIGS. 5a and 5b. It is possible to see the sensor module fitted on the wall 28, and enclosed essentially by the housing 2 and cover 8. The sensor module is fitted on the side of the dry space 30, there being a connection between the pressure sensor 6 and the wet space 32 via the through-passage channel 22 and a through-opening 64 in the wall 28. Positioned between the cover 8 and wall 28 is an encircling seal 62, which is intended to prevent moisture from passing through from the wet space 32 into the dry space 30.

It is also possible to see a labyrinthine connection between the wet space 32 and pressure sensor 6, which is thus reliably protected against splash water from the wet space 32. The protection is formed from a plurality of components, namely an encircling deflector 56, which projects in a ridge-like manner from the wall 28 and encloses the through-opening 64 from three sides. The ridge-like deflector 56 is only interrupted in the downward direction, with the result that splash water and condensation can run off along the wall in the downward direction without obstruction. Projecting into the through-opening 64 is a run-off nose 60 that is integrally formed on the cover 8 and likewise allows water to run off in the downward direction without obstruction. The run-off nose 60 here does not come into contact with the wall 28 and the edges of the through-opening 64, with the result that all the water which collects in the run-off nose 60 can drip off without obstruction. Part of the wall 28 is configured as a splash wall 58, which is disposed in front of the through-passage channel 22 such that the latter and the pressure sensor 6 located at its end are protected against any direct splash water.

The particular configuration of the sensor module projecting into the wet space 32 through the through-opening 64 in the wall 28 can be seen even more clearly in the perspective view, partially in section, of FIG. 7. The illustration has been rotated such that the left-hand part of the FIG. 7 is oriented downward in the installed state, with the result that the open section of the ridge-like deflector 56, which is integrally formed in the wall 28, is oriented downward and thus makes it possible for all the splash water to run off without obstruction. At the same time, it ensures a certain level of splash protection for the other sides and prevents splash water from affecting a channel 23, which is located downstream of the through-opening 64 and leads to the through-passage channel 22, to too pronounced an extent. The illustration also clearly shows the downwardly tapering run-off nose 60, of which the inner hollow-like surface is angled outward in relation to the channel 23 at an angle which is greater than 30°, with the result that water which has penetrated into the channel 23 can drip off and/or run off downward, into the bottom region of the wet space 32, via the hollow-like run-off nose 60.

Of course, the embodiments described are only given by way of example, and a variety of further modifications which go beyond the embodiments described and by which the pressure-sensitive surface of the pressure sensor 6 is connected to the wet space 32 through the wall 28 either directly or with the interposition of the diaphragm, although the dry space 30 and the housing interior are nevertheless sealed reliably in relation to the wet space 32, are possible.

We claim:

1. A sensor module to be fitted on a wall having an opening formed therein, the sensor module comprising:
   a housing to be disposed in the wall and having a housing interior;
   a cover attached to said housing;
   a pressure sensor disposed in said housing and having a pressure-sensitive sensor surface;
   a sealing cushion for sealing said housing interior from the environment, said sealing cushion having a through-passage channel formed therein connecting said pressure-sensitive sensor surface to the environment; and
   a socket connecting said through-passage channel to the environment through the opening of the wall, said socket having an end butting with sealing action against said sealing cushion, and said sealing cushion being clamped inbetween said socket and said pressure sensor and pressing with sealing action against said pressure sensor.

2. The sensor module according to claim 1, including a sealing body attached to said socket such that, with the sensor module fitted on the wall, said sealing body is disposed between an outside of said socket and the opening in the wall.

3. The sensor module according to claim 1, wherein said socket is guided through said cover, and said socket having an annular flange which butts against an inside of said cover.

4. The sensor module according to claim 3, including a printed circuit board disposed in said housing and bearing said pressure sensor;
   wherein said annular flange of said socket has a side directed away from said inside of said cover, said annular flange having resilient legs on said side for fitting said socket on said printed circuit board.

5. The sensor module according to claim 2, wherein said socket is guided through said sealing body.

6. The sensor module according to claim 2, wherein said socket is inserted into said sealing body, and said sealing body is configured with an extension extending from said socket.

7. The sensor module according to claim 1, wherein said cover and said socket are formed as a one piece unit, said cover having a run-off nose from which water can drip off, and with the sensor module fitted on the wall, part of said cover along with part of the wall forms a further channel connecting said through-passage channel to the opening in the wall.

8. The sensor module according to claim 1, including a printed circuit board clamped inbetween parts of said housing, and said pressure sensor being disposed on said printed circuit board.

9. The sensor module according to claim 1, including a diaphragm disposed between said through-passage channel of said sealing cushion and said pressure-sensitive senor surface of said pressure sensor.

* * * * *